Patented Apr. 29, 1952

2,594,946

UNITED STATES PATENT OFFICE 2,594,946

METHOD FOR SEPARATING DIORGANO-HALOGENOSILANES FROM MIXTURES OF THE LATTER AND ORGANOTRIHALO-GENOSILANES

Glennard R. Lucas, Pittsfield, Mass., assignor to General Electric Company, a corporation of New York No Drawing. Application January 4, 1951, Serial No. 204,462

11 Claims. (Cl. 260—448.2)

This invention is concerned with a method for obtaining substantially pure diorganodihalogenosilane from a mixture of the latter with organotrihalogenosilanes. The invention relates particularly to obtaining essentially pure dimethyldichlorosilane from mixtures of the latter and methyltrichlorosilane by treating the said mixture with a diorganodiacyloxy silane corresponding to the general formula $R_2SiX_2$ where R is an organic hydrocarbon radical and X represents the anion of any organic or inorganic acid where the acid so represented is weaker than hydrochloric acid.

It is often highly desirable in the preparation of organopolysiloxanes, for example, resins, oils, rubbers, etc., to have essentially pure intermediates, particularly diorganodihalogenosilanes, for instance, dimethyldichlorosilane, in order that one may obtain the desired properties when the organohalogenosilane is hydrolyzed to prepare the aforementioned resins, oils and rubbers. However, great difficulty has often been encountered in obtaining essentially pure diorganodihalogenosilanes from mixtures of the latter and organotrihalogenosilanes because of the extremely close boiling points of the two materials. Thus, dimethyldichlorosilane boils at 70.0° C. and methyltrichlorosilane boils at 65.7° C., and even after long and expensive processing of the mixture, there are usually undesirable amounts of the methyltrichlorosilane still present in the dimethyldichlorosilane.

I have now discovered that I am able to effect almost complete removal of organotrihalogenosilanes, for example, methyltrichlorosilane, from mixtures of the organotrihalogenosilane with diorganodihalogenosilanes, for example, dimethyldichlorosilane, by effecting reaction between the mixture of organohalogenosilanes with a diorganosilane containing two silicon-bonded acyloxy radicals and two silicon-bonded organic groups wherein the acyloxy radicals represent the anion of any organic or inorganic acid which is weaker than hydrochloric acid.

The mixture of diorganohalogenosilane and organotrihalogenosilane may be represented by any one of the various organohalogenosilanes corresponding to the general formulas $RR'SiZ_2$ and $R'SiZ_3$, where R is a monovalent hydrocarbon radical and R' is the same or another monovalent hydrocarbon radical, and Z represents a halogen for example chlorine, bromine, fluorine, etc. Among the values which R and R' may be are, for example, alkyl radicals, for instance, methyl, ethyl, propyl, isopropyl, butyl, amyl, octyl, decyl, etc.; aryl radicals, for instance, phenyl, naphthyl, anthracyl, etc.; aralkyl radicals, for example, benzyl, phenylethyl, etc.; alkaryl radicals, for example, tolyl, xylyl, etc.; cycloaliphatic, for example, cyclopentyl, cyclohexyl, etc. as well as hydrocarbon radicals containing inert substituents thereon as, for example, halogens, etc. This process shows to greatest advantage in the case where R is a methyl radical and R' is either also a methyl radical or other monovalent hydrocarbon radical, e. g., a phenyl radical.

The ratio of the diorganodihalogenosilane and the monorganotrihalogenosilane may be varied within wide limits. Thus, the monorganotrihalogenosilane may be present in a molar ratio of from about 0.05 to 50 or 60 mol percent or higher of the total molar concentration of the mixture of the organohalogenosilanes. My process is particularly applicable in cases where the molar concentration of the organotrihalogenosilane is preferably below 10 mol percent and advantageously below 5 mol percent under which conditions fractional distillation as a means of separation becomes increasingly less effective in reducing the amount of organotrihalogenosilane present.

In carrying out the claimed process, the diorganodiacyloxysilane is added in a molar concentration such that at least one halogen of the organotrihalogenosilane is replaced with an acyloxy group. The use of diacyloxysilanes whose anion is derived from acids weaker than hydrochloric acid results in replacement of at least one halogen of the organotrihalogenosilane to form an acyloxy derivative thereof which then permits easy separation of the diorganohalogenosilane. Because of this, it will be apparent that the molar concentration of the diacyloxysilane can be varied within wide limits. Generally I prefer to add the diacyloxysilane in at least a molar equivalent to the organotrihalogenosilane. For optimum results, at least slight molar excesses of the diacyloxysilane may be employed. Too large an excess serves no useful purpose, although such excesses are not precluded.

The diorganodiacyloxysilanes may be represented by the formula $R''_2SiX_2$ where R'' is the same as R' in the organohalogenosilane. Among the values of X in the diorganodiacyloxysilane one may include, for example, anions of acids weaker than hydrochloric acid (that is one whose ionization constant in water is less than that of hydrochloric acid) such as hydrogen cyanide, acetic acid, propionic acid, butyric acid, etc.

Generally, when employing organic acids, it is preferable to maintain the number of carbon atoms in the acyloxy radical (including the carboxy carbon) below 5 since as the length of the acyloxy chain increases, there is less tendency for the acyloxysilane to react with the organotrihalogenosilane. Examples of the diorganodiacyloxysilanes are, for instance, dimethyl silyl diacetate, diphenyl silyl diacetate, diethyl silyl diacetate, dimethyl silyl dipropionate, dimethyl silyl dibutyrate, etc. The respective diorganodiacyloxysilanes can be prepared, for instance, by effecting reaction between a diorganodihalogenosilane and the particular acid (either organic or inorganic) which is weaker than hydrochloric acid. It is, of course, apparent that instead of using organic or inorganic acids, the anhydrides of such acids may also be used in preparing the diorganodiacyloxysilanes.

Generally, I prefer that the organic group attached to silicon in the diorganodiacyloxysilane be the same as the organic groups in the mixture of organohalogenosilanes. However, this is not essential since the primary function of the acyloxy silane is to provide acyloxy groups for replacement of the halogens in the organotrihalogenosilane. It is desired to point out that if the organic groups in the diorganodiacyloxysilane are the same as the organic groups attached to silicon in the mixture of organohalogenosilanes, that when one obtains substantially pure diorganodihalogenosilane as the result of the reaction, the interchange of halogens and acyloxy groups between the organotrihalogenosilane and the diorganodiacyloxysilane will give additional amounts of diorganodihalogenosilane thus making it advantageous to keep the organic groups essentially the same throughout the mixture of ingredients.

It will, of course, be apparent that the amount of diorganodiacyloxy silane which is used should be sufficient or be present in an amount adequate to react with the organotrihalogenosilane and convert it to the organotriacyloxysilane which has a sufficiently high boiling point so that distillation of the pure diorganodihalogenosilane can be effected without difficulty. In general, it is desirable to employ at least one molar equivalent of the diorganodiacyloxysilane per mol of organotrihalogenosilane. With particular reference to the purification of a mixture of methyl trichlorosilane and dimethyldichlorosilane, the following equation illustrates the reaction which is believed to take place as a result of the separation of the dimethyldichlorosilane.

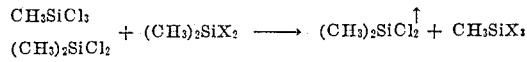

where X represents the anion of the organic or inorganic acid which is weaker than hydrogen chloride (hydrochloric acid). An example of the dimethyldiacyloxysilane is dimethyldiacetoxysilane. Generally I prefer to use at least a slight excess of the diorganodiacyloxysilane over the amount of organotrihalogenosilane present in the mixture of organohalogenosilanes.

After forming the mixture of the organohalogenosilanes and the diorganodiacyloxysilane, the mixture may be allowed to remain at room temperature with stirring or it may be heated to accelerate the rate of reaction. As an alternative, certain catalysts, for example triethanolamine triacetate

etc., may be used. Even with the addition of the catalyst, heat may be applied to the reaction mixture to hasten the formation of the organotriacyloxysilane. Generally when heat is applied it is desirable to reflux the mixture for varying lengths of time, for example, of the order of from about 10 to 60 minutes or even more to make sure that reaction is complete. Thereafter, the reaction mixture is fractionally distilled to remove essentially pure diorganodihalogenosilane.

In order that persons skilled in the art may better understand how the present invention may be practiced, the following examples are given by way of illustration and not by way of limitation. All parts are by weight.

*Example 1*

In this example 187 parts of dimethyldiacetoxy silane was mixed with 100 parts of a mixture of dimethyldichlorosilane and methyltrichlorosilane having a density of 1.257 and containing approximately 90 mol percent methyltrichlorosilane and 10 mol percent dimethyldichlorosilane. When the ingredients were mixed, there was no apparent heat of reaction. However, when three grams of triethanolamine triacetate was added, the temperature of the mixture immediately rose, indicating reaction, and the contents of the reaction vessel reached a temperature of 39° C. without external heating. The mixture was then heated at reflux for 30 minutes and then distilled using a Claisen head with no distillation column. The product distilling had a density of 1.076 which compared favorably with essentially pure dimethyldichlorosilane which has a density of about 1.069 indicating that substantially pure dimethyldichlorosilane was obtained during the distillation.

*Example 2*

In this example the work described in Example 1 was repeated with the exception that 176 parts dimethyldiacetoxysilane was placed in a reaction vessel and two parts triethanolamine triacetate added. Thereafter, 50 parts of the same mixture of methyl chlorosilanes employed in Example 1 was added and the temperature of the mixture then rose from 25° C. to 34.5° C. due to the heat of the reaction. Heat was applied and the product was distilled as before to give a dimethyldichlorosilane fraction having a density of 1.066. This product appeared to be very pure dimethyldichlorosilane even though the initial mixture contained 90% methyltrichlorosilane and even though methyltrichlorosilane is the lowest boiling species in the equilibrium.

*Example 3*

In this example, the same procedure was followed as in Example 2 with the exception that the triethanolamine triacetate was not used. More particularly, 176 parts dimethyldiacetoxysilane was mixed with 50 parts of the mixture of methyltrichlorosilane and dimethyldichlorosilane and the mixture heated to distillation using a three-bulb Snyder column. The flask temperature was 124° C. at the start of the distillation. The chlorosilane which was obtained from the distillation had a density of 1.067 indicating that it was essentially pure dimethyldichlorosilane. Thus, under the conditions of heating to the distillation temperature, the reaction producing dimethyldichlorosilane from dimethyl diacetoxysilane and methyltrichlorosilane had occurred without the necessity of a catalyst.

Example 4

In the preparation of dimethyl silicone rubber (solid, elastic, polymeric dimethylsiloxane), it is usually desirable to have essentially pure dimethyl silicone or polymeric dimethylsiloxane free of undesirable traces of copolymerized monomethylsiloxane. Thus, generally, when one fractionally distills the dimethyldichlorosilane obtained from the reaction of methyl chloride and silicon in the presence of copper as disclosed and claimed in Rochow Patent 2,380,995 assigned to the same assignee as the present invention, even the most careful fractionation through a 200 plate column gives dimethyldichlorosilane which contains approximately 99.6 mol percent dimethyldichlorosilane and 0.4 mol percent methyltrichlorosilane. In this example, the dimethyldichlorosilane thus obtained was purified by mixing 2500 grams of this so-called pure dimethyldichlorosilane with 221 parts of dimethyldiacetoxysilane and then five parts triethanolamine triacetate were added. The mixture was heated to distill dimethyldichlorosilane through a three-bulb Snyder column. Approximately 2200 grams of dimethyldichlorosilane was distilled from the mixture. This purified dimethyldichlorosilane was hydrolyzed by adding with vigorous stirring over a 10 minute period about 1,000 cc. of the dimethyldichlorosilane to 8000 c. c. water. The oil which separated was removed, washed with water and dried over sodium carbonate. About 200 parts of this dimethyl silicone oil was mixed with 0.01%, by weight, potassium hydroxide at 150° C. and heated. It was found that even after heating at 150° C. for three hours, there was no evidence of gelation of the silicone oil. In contrast to this, a silicone oil made from the original dimethyldichlorosilane containing the impurity of the methyltrichlorosilane, when treated with the same amount of potassium hydroxide and heated at 150° C., set to a very stiff gel after only a few minutes. This established clearly that the amount of methyl trichlorosilane in the purified product had been greatly reduced, much below that present in the original dimethyldichlorosilane composition.

Example 5

In this example, 6200 parts of dimethyldichlorosilane (99.6 mol percent) containing 0.4 mol percent methyl trichlorosilane was placed in a reaction vessel and to this was added 300 parts acetic anhydride and 10 parts triethanolamine triacetate. The mixture was heated and the dimethyldichlorosilane distilled through a four-bulb Snyder column using a cold finger to increase reflux. By this process 5990 parts of material was distilled and processed a second time by adding 300 parts acetic anhydride and 10 parts of triethanolamine triacetate and then distilling a second time. This gave approximately 5,000 parts of dimethyldichlorosilane which had been twice purified with acetic anhydride. It was tested by hydrolyzing to give a silicone oil as described above in Example 4, and bodied with 0.01%, by weight, potassium hydroxide to give a silicone gum. It appeared to approach a gel character after long heating, and it was apparent that the acetic anhydride was not as effective in reducing trifunctional content of the dimethyldichlorosilane as was the dimethyldiacetoxysilane.

Example 6

It has been shown above in Example 3 that without the addition of triethanolamine triacetate, the reaction converting methyltrichlorosilane to a high boiling acetoxysilane was slower but appeared to occur almost completely when heat was applied. In this example, 410 parts of dimethyldiacetoxysilane was combined with 4,000 parts of the mixture of dimethyldichlorosilane and methyltrichlorosilane employed initially in Example 4. The mixture was heated to reflux for three hours to permit the reaction to go to completion. Purified dimethyldichlorosilane was then distilled through a three-bulb Snyder column using a cold finger to increase the reflux ratio. Approximately 3,000 parts of essentially pure dimethyl dichlorosilane was distilled and tested in the following manner.

About 1330 cc. of the purified dimethyldichlorosilane was added slowly to 8,000 grams of water with vigorous stirring. After addition was complete, the silicone oil which separated was washed with water and dried over sodium carbonate. 200 parts of the purified dimethyl silicone oil was heated with 0.01%, by weight, thereof potassium hydroxide at 150° C. to convert it to a silicone gum. It was found that the fluid became viscous but did not gel after four hours heating. Even heating for extended periods of time failed to give a gel of a character which was obtained in a few minutes when the original unpurified product was hydrolyzed to an oil and treated in the same manner with potassium hydroxide and heated at the 150° C. temperature.

Although the foregoing examples are concerned with the purification of dimethyldichlorosilane from mixtures of the latter with methyltrichlorosilane, it will be apparent to persons skilled in the art that other mixtures of diorganodihalogenosilanes and organotrihalogenosilanes, many examples of which have been given previously, may be used without departing from the scope of the invention. In addition, other diorganodiacycloxy silanes may be used in place of the dimethyldiacetoxysilane employed in the foregoing examples. Finally, the conditions may be varied, and the proportion of ingredients as well as the ratio of diorganodihalogenosilane and organotrihalogenosilane may also be varied without departing from the scope of the invention.

My invention has various uses as pointed out previously, particularly as a means of separating trifunctional organotrihalogenosilanes from mixtures of the latter with diorganodihalogenosilanes. As pointed out above, the invention may be used to purify dimethyldichlorosilane contaminated with methyltrichlorosilane. In addition, it may also be used to purify methyl phenyldichlorosilane which may contain as an impurity phenyltrichlorosilane. Such mixtures containing the phenyltrichlorosilane impurities may result when one effects a Grignard reaction between phenyltrichlorosilane and a methyl Grignard to produce methyl phenyldichlorosilane. Because of the close boiling points of the phenyltrichlorosilane and the methyl phenyldichlorosilane, it is often almost impossible to obtain pure methyl phenyldichlorosilane. My process permits obtaining the pure methyl phenyldichlorosilane easily and with little expense. The purified methyl phenyldichlorosilane, and dimethyldichlorosilane are useful in making silicone oils and silicone resins. The silicone resins and oils, prepared as a result of hydrolyzing the purified organohalogenosilanes obtained in essentially pure state by means of my process are eminently suitable in applications requiring good resistance to heat and also in applications requiring materials which are essentially unchanged and do not become embrittled at low temperatures.

In the manufacture of silicone rubbers, especially methyl silicone rubber, it is highly desirable that the starting dimethyldichlorosilane be essentially free of trifunctional methyltrichlorosilane since the presence of even small amounts of the latter trifunctional material affects deleteriously the strength properties of rubbers made from these starting materials. In addition, my process permits more careful quality control of raw intermediates used in making the various silicone products. Finally, my process can be used to determine the presence of organotrihalogenosilanes in mixtures of the latter, even in small amounts, with diorganodihalogenosilanes. In this latter respect, the process can be used actually as a test for the presence of organotrihalogenosilane.

What I claim as new and desire to secure by Letters Patent of the United States is:

1. The process for obtaining diorganodihalogenosilane containing less mono-organotrihalogenosilane from a mixture of the aforesaid organohalogenosilanes, the organic groups in the aforesaid organohalogenosilanes being hydrocarbon radicals attached directly to silicon by carbon-silicon linkages, which process comprises effecting reaction between the said mixture of organohalogenosilanes and a diorgano diacyloxysilane, the organic groups of the aforesaid acyloxysilane being hydrocarbon radicals attached directly to silicon by carbon-silicon linkages and the acyloxy radical being derived from an acid weaker than hydrochloric acid, and thereafter isolating diorganodihalogenosilane containing less mono-organotrihalogenosilane than was originally present therein.

2. The process for obtaining diorganodihalogenosilane containing less mono-organotrihalogenosilane from a mixture of the aforesaid organohalogenosilanes, the organic groups in the aforesaid organohalogenosilanes being hydrocarbon radicals attached directly to silicon by carbon-silicon linkages, which process comprises effecting reaction between the said mixture of organohalogenosilanes and a diorganodiacyloxysilane, the organic groups of the aforesaid acyloxysilane being hydrocarbon radicals attached directly to silicon by carbon-silicon linkages and the acyloxy radical being derived from an acid weaker than hydrochloric acid, wherein the latter diorganodiacyloxysilane is present in a molar amount at least equivalent to the molar concentration of the mono-organotrihalogenosilane, and thereafter isolating diorganodihalogenosilane essentially free of mono-organotrihalogenosilane.

3. The process for obtaining dimethyldihalogenosilane containing less methyltrihalogenosilane from a mixture of the aforesaid methylhalogenosilanes, which process comprises effecting reaction between the said mixture of methylhalogenosilanes and a diorganodiacyloxysilane, the organic groups in the aforesaid acyloxysilane being hydrocarbon radicals attached directly to silicon by carbon-silicon linkages and the acyloxy radical being derived from an acid weaker than hydrochloric acid, and thereafter isolating dimethyldihalogenosilane containing less methyltrihalogenosilane than was originally present therein.

4. The process for obtaining diorganodihalogenosilane containing less mono-organotrihalogenosilane from a mixture of the aforesaid organohalogenosilanes, the organic groups in the aforesaid organohalogenosilanes being hydrocarbon radicals attached directly to silicon by carbon-silicon linkages, which process comprises effecting reaction between the said mixture of organohalogenosilanes and a diorganodiacetoxysilane, the organic groups of the aforesaid acetoxysilane being hydrocarbon radicals attached directly to silicon by carbon-silicon linkages, and thereafter isolating diorganodihalogenosilane containing less mono-organotrihalogenosilane than was originally present therein.

5. The process for obtaining dimethyldichlorosilane containing less methyltrichlorosilane from a mixture of the aforesaid methylchlorosilanes, which process comprises effecting reaction between the said mixture of methylchlorosilanes and a diorganodiacetoxysilane, the organic groups in the aforesaid acetoxysilane being hydrocarbon radicals attached directly to silicon by carbon-silicon linkages, and thereafter isolating dimethyldichlorosilanes containing less methyltrichlorosilane than was originally present therein.

6. The process for obtaining diorganodihalogenosilane containing less mono-organotrihalogenosilane from a mixture of the aforesaid organohalogenosilanes, the organic groups in the aforesaid organohalogenosilanes being hydrocarbon radicals attached directly to silicon atoms by carbon-silicon linkages, which process comprises effecting reaction between the said mixture of organohalogenosilanes and a diorganosilane containing two silicon-bonded anions of an acid of weaker acid strength than hydrochloric acid, and thereafter isolating the diorganodihalogenosilane containing less mono-organotrihalogenosilane than was originally present therein.

7. The process for obtaining essentially pure dimethyldichlorosilane from a mixture of the latter and methyltrichlorosilane, which process comprises effecting reaction between the said mixture of methylchlorosilanes and dimethyldiacetoxysilane, said dimethyldiacetoxysilane being present in a molar amount at least equivalent to the molar concentration of the methyltrichlorosilane, and thereafter isolating the dimethyldichlorosilane substantially free of methyltrichlorosilane.

8. The process for obtaining essentially pure dimethyldichlorosilane from a mixture of the latter and methyltrichlorosilane, which process comprises effecting reaction between the said mixture of methylchlorosilanes and dimethyldipropionoxysilane, the said dimethyldipropionoxysilane being present in a molar amount at least equivalent to that of the molar concentration of the methylchlorosilanes, and thereafter isolating essentially pure dimethyldichlorosilane from the reaction mixture.

9. The process for obtaining essentially pure dimethyldichlorosilanes from a mixture of the latter and methyltrichlorosilane, which process comprises heating a mixture of ingredients comprising (a) the mixture of dimethyldichlorosilane and methyltrichlorosilane with (b) dimethyldiacetoxysilane in the presence of (c) a small amount of triethanolamine triacetate, and thereafter isolating essentially pure dimethyldichlorosilane from the reaction mass.

10. The process for obtaining methyl organodihalogenosilane containing less organotrihalogenosilane from a mixture of the aforesaid organohalogenosilanes, the organic groups in the aforesaid organohalogenosilanes being hydrocarbon radicals attached directly to silicon by carbon-silicon linkages, which process comprises effecting reaction between the said mixture of organohalogenosilanes and a diorganodiacyloxysilane, wherein the latter diorganodiacyloxysilane is present in a molar amount at least equivalent to the molar concentration of the organotrihalogenosilane, the organic groups in the aforesaid acyloxysilane being hydrocarbon radicals attached directly to the silicon by carbon-silicon linkages and the acyloxy radical being derived from an acid weaker than hydrochloric acid, and thereafter isolating methyl organodihalogenosilane essentially free of monoorganotrihalogenosilane.

11. The process for obtaining methylphenyldichlorosilane containing less phenyltrichlorosilane from a mixture of the aforesaid organochlorosilanes, which process comprises effecting reaction between the said mixture of organochlorosilane and dimethyldiacetoxy, wherein the latter silane is present in a molar amount at least equivalent to the molar concentration of the phenyltrichlorosilanes, and thereafter isolating methylphenyldichlorosilane substantially free of phenyltrichlorosilane.

GLENNARD R. LUCAS.

REFERENCES CITED

The following references are of record in the file of this patent:

FOREIGN PATENTS

| Number | Country | Date |
|---|---|---|
| 622,985 | Great Britain | May 10, 1949 |